United States Patent [19]
Olgren et al.

[11] Patent Number: 6,139,057
[45] Date of Patent: Oct. 31, 2000

[54] POSITION CONTROL APPARATUS FOR STEERING COLUMN

[75] Inventors: Leland Nels Olgren, Frankenmuth; Kevin Carlton Ross, Hemlock, both of Mich.

[73] Assignee: Delphi Technologies, Inc., Troy, Mich.

[21] Appl. No.: 09/244,382

[22] Filed: Feb. 4, 1999

[51] Int. Cl.[7] .................................................. B62D 1/18
[52] U.S. Cl. ............................ 280/775; 280/777; 74/493
[58] Field of Search .................................. 280/775, 777, 280/779; 74/492, 493, 497, 534, 541

[56] References Cited

U.S. PATENT DOCUMENTS

| | | | |
|---|---|---|---|
| 4,541,298 | 9/1985 | Strutt | 280/775 |
| 4,593,577 | 6/1986 | Kinoshita | 74/493 |
| 4,938,093 | 7/1990 | Matsumoto et al. | 74/493 |
| 5,029,489 | 7/1991 | Burmeister et al. | 74/493 |
| 5,052,240 | 10/1991 | Miyoshi et al. | 280/777 |
| 5,503,431 | 4/1996 | Yamamoto | 280/777 |
| 5,524,927 | 6/1996 | Toussaint | 280/777 |
| 5,570,610 | 11/1996 | Cymbal | 74/493 |
| 5,722,299 | 3/1998 | Yamamoto et al. | 280/775 |
| 5,787,759 | 8/1998 | Olgren | 74/493 |
| 5,823,062 | 10/1998 | Snell et al. | 280/775 |
| 5,871,233 | 2/1999 | Tanaka et al. | 280/777 |
| 6,068,295 | 5/2000 | Skabrond et al. | 280/775 |

*Primary Examiner*—Brian L. Johnson
*Assistant Examiner*—Christopher D Bottorff
*Attorney, Agent, or Firm*—Edmund P. Anderson

[57] ABSTRACT

A position control apparatus for an adjustable motor vehicle steering column including a friction clamp, a control shaft rotatable between locked and unlocked positions, a hollow rectangular frame moveable relative to the control shaft when the steering column is adjusted, a first toothed pawl a second toothed pawl, and an elastic bushing resiliently supporting the first and second toothed pawls on the control shaft inside of the rectangular frame. When the control shaft is rotated to its locked position the friction clamp frictionally captures the adjusted position of the steering column. The pawls have gear sectors thereon which are relatively angularly offset by one-half tooth pitch. When the control shaft is rotated to its locked position, the one-half tooth pitch offset assures that at least one of the gear sectors will mesh with a rack gear on the rectangular frame even if the other engages the rack gear peak-to-peak. Each pawl further includes a lug which cooperates with a plain edge of the rectangular frame in immobilizing the pawl when the gear sector thereon is meshed with the rack gear so that the meshed tooth couple between the gear sector and the rack gear reinforces the friction clamp.

6 Claims, 2 Drawing Sheets

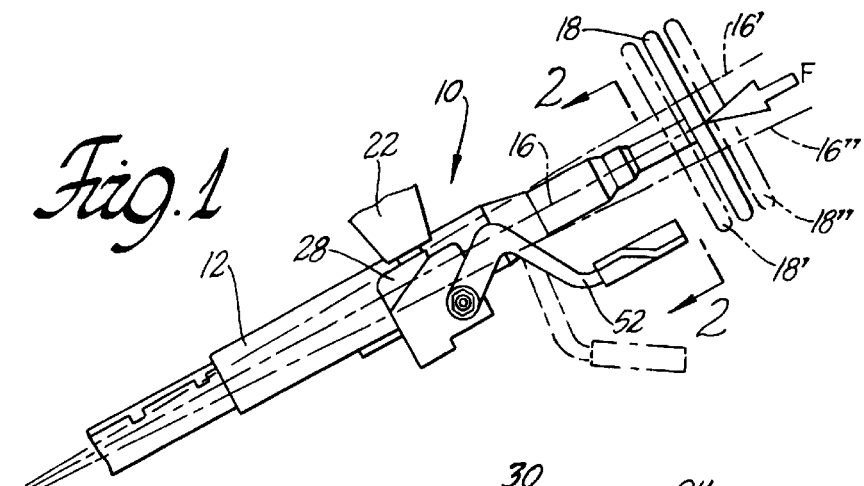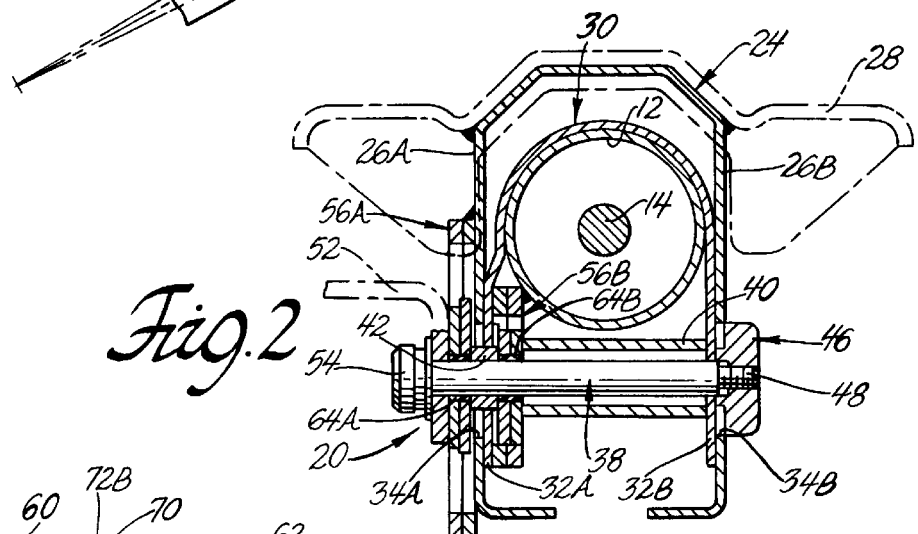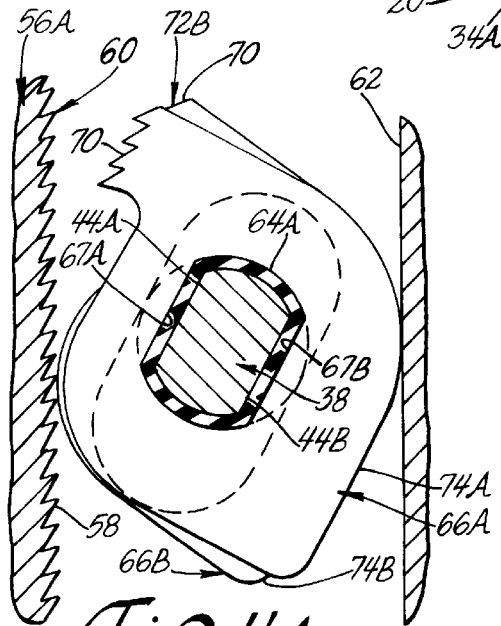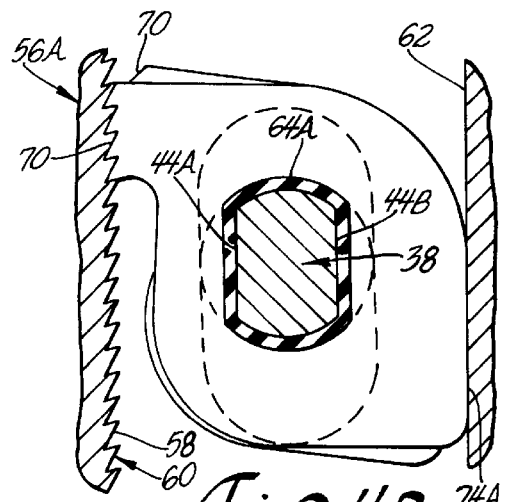

POSITION CONTROL APPARATUS FOR STEERING COLUMN

TECHNICAL FIELD

This invention relates to a position control apparatus for an adjustable motor vehicle steering column.

BACKGROUND OF THE INVENTION

U.S. Pat. No. 5,524,927 describes an adjustable motor vehicle steering column including a length-adjustable mast jacket and a position control apparatus for capturing the position of the mast jacket. The position control apparatus includes a clamp which frictionally couples the mast jacket to body of the motor vehicle when a control lever of the apparatus is pivoted to a locked position. The position control apparatus further includes a toothed ratchet block on the mast jacket and a toothed pawl connected to the control lever for pivotal movement as unit therewith and for limited pivotal movement relative thereto. When the control lever is pivoted to its locked position, the pawl meshes with the ratchet block and cooperates therewith in defining a meshed toothed couple which reinforces the friction couple. Peak-to-peak engagement between the pawl and the ratchet block, however, inhibits the pawl from meshing with the ratchet block and may compromise the performance of the position control apparatus during an impact on the steering hand wheel. A position control apparatus according to this invention is a novel alternative to the position control apparatus described in the aforesaid U.S. Pat. No. 5,524,927.

SUMMARY OF THE INVENTION

This invention is a new and improved position control apparatus for an adjustable motor vehicle steering column including a friction clamp, a control shaft rotatable between locked and unlocked positions, a hollow rectangular frame moveable relative to the control shaft when the steering column is adjusted, a first toothed pawl, a second toothed pawl and an elastic bushing resiliently supporting the first and second toothed pawls side-by-side on the control shaft inside of the rectangular frame. When the control shaft is rotated to its locked position the friction clamp frictionally captures the adjusted position of the steering column. The pawls have gear sectors thereon which are angularly offset relative to each other by one-half tooth pitch. When the control shaft is rotated to its locked position, the one-half tooth pitch offset assures that at least one of the gear sectors will mesh with a rack gear on the rectangular frame even if the other engages the rack gear peak-to-peak. Each pawl further includes a lug which cooperates with a plain edge of the rectangular frame in immobilizing the pawl when the gear sector thereon is meshed with the rack gear so that the meshed tooth couple between the gear sector and the rack gear reinforces the friction clamp.

BRIEF DESCRIPTION OF THE DRAWINGS

FIG. 1 is a fragmentary elevational view of motor vehicle steering column having a position control apparatus according to this invention;

FIG. 2 is an enlarged sectional view taken generally along the plane indicated by lines 2—2 in FIG. 1;

FIGS. 4A–4B are views taken generally along the plane indicated by lines 4—4 in FIG. 3 showing structural elements of the position control apparatus according to this invention in different relative positions.

DESCRIPTION OF THE PREFERRED EMBODIMENT

Figure 3:
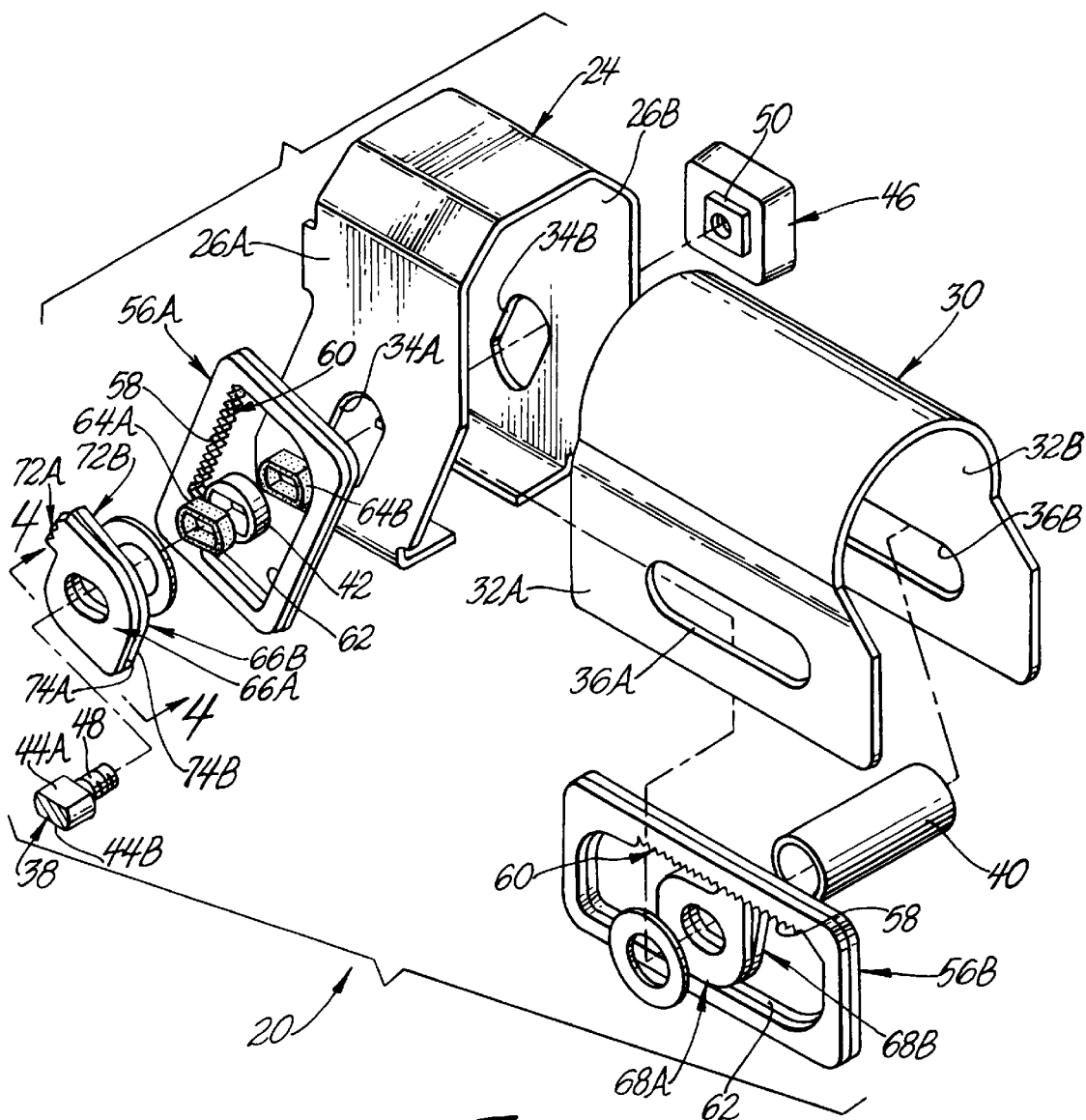
FIG. 3 is an exploded perspective view of the position control apparatus according to this invention.

Referring to FIGS. 1–2, an adjustable motor vehicle steering column 10 includes a mast jacket 12 and a steering shaft 14 supported on the mast jacket for rotation about a longitudinal centerline 16 of the latter. A steering hand wheel 18 is rigidly attached to an upper end of the steering shaft 14. The mast jacket 12 is adjustable vertically relative to a body, not shown, of the motor vehicle to adjust the vertical position of the steering hand wheel 18 between limits represented by upper and lower positions 16',16" of the centerline 16. The mast jacket 12 is adjustable horizontally to adjust the horizontal position of the steering hand wheel 18 between inner and outer limit positions 18',18". A position control apparatus 20 according to this invention is disposed between the mast jacket 12 and a schematically represented structural element 22 of the vehicle body for capturing the horizontal and vertical adjusted positions of the mast jacket.

As seen best in FIGS. 1–3, the position control apparatus 20 includes an outer bracket 24 in the shape of an inverted "U" having a pair of vertical sides 26A,26B on opposite sides of the mast jacket 12. A wing,-shaped flange 28 is welded to the outer bracket and releasably attached to the structural element 22 of the vehicle body. An energy absorber, not shown is disposed between the outer bracket 24 and the vehicle body. The wing-shaped flange 28 separates from the structural element 22 to permit an energy absorbing stroke of the outer bracket as a unit with the mast jacket in the event of an impact on the steering, hand wheel 18 represented by a schematic vector force "F", FIG. 1.

An inner bracket 30 of the position control apparatus 20 also in the shape of an inverted "U" is disposed inside of the outer bracket 24 and is welded to the mast jacket 12. A pair of vertical sides 32A,32B of the inner bracket are juxtaposed the vertical sides 26A,26B, respectively, of the outer bracket. The vertical sides 26A,26B of the outer bracket have respective ones of a pair of substantially vertical slots 34A,34B therein. The vertical sides 32A,32B of the inner bracket have respective ones of a pair of horizontal slots 36A,36B therein parallel to the longitudinal centerline 16 of the mast jacket.

A control shaft 38 of the position control apparatus 20 traverses the inner and outer brackets 30,24 through a pair of apertures defined by the intersections of the vertical and horizontal slots 34A,36A and 34B,36B and through a compression tube 40 between the vertical sides 32A,322B of the inner bracket. A plastic bushing 42, FIGS. 2–3, is rotatably coupled to the control shaft by a pair of flat sides 44A,44B of the latter and disposed in the aperture defined at the intersection of the vertical and horizontal slots 34A,36A. A nut 46 on a screwed threaded end 48 of the control shaft outside of the vertical side 26B of the outer bracket has a boss 50, FIG. 3, slidable in the vertical slot 34B. During vertical adjustment of the mast jacket, the control shaft moves up and down in the vertical slots 34A,34B as a unit with the inner bracket and the mast jacket. During horizontal adjustment of the mast jacket, the horizontal slots 36A,36B in the inner bracket move back and forth over the control shaft 38 which is restrained horizontally by the sides of the vertical slots 34A,34B.

The nut 46 cooperates with the plastic bushing 42 in rotatably supporting the control shaft on the inner and the outer brackets 30,24. A manual control lever 52 is supported on the control shaft outside of the vertical side 26A of the outer bracket for rotation as a unit with the control shaft between a locked position and an unlocked position illustrated respectively, in solid and broken lines in FIG. 1. Dislodgment of the control lever 52 from the control shaft 38 is prevented by an enlarged head 54 on the end of the control shaft.

As seen best in FIGS. 2–4, the position control apparatus 20 further includes a pair of hollow rectangular frames 56A,56B made from multiple thin plates or as unitary structural elements. The rectangular frame 56A is welded to the outside of the vertical side 26A of the outer bracket facing the control lever 52 and around the control shaft 38 and the vertical slot 34A. The rectangular frame 56B is welded to the inside of the vertical side 32A of the inner bracket facing an end of the compression tube 40 and around the control shaft and the horizontal slot 36A. Each rectangular frame 56A,56B has an edge parallel to the corresponding one of the vertical and horizontal slots interrupted by a plurality of gear teeth 58 defining a rack gear 60 and a plain edge 62 parallel to the rack gear and on the opposite side of the control shaft from the rack gear.

A pair of elastic bushings 64A,64B on opposite sides of the plastic bushing 42 are rotatably coupled to the control shaft 38 by the flat sides 44A,44B of the control shaft. A first pair of flat pawls 66A,66B are supported side-by-side on the control shaft 38 inside of the rectangular frame 56A by the elastic bushing 64A for rotation as a unit with the control shaft. Respective ones of a pair of flat edges 67A,67B of an aperture in each of pawls 66A,66B face the flat sides 44A,44B of the control shaft and cooperate therewith in limiting relative rotation between the pawls and the control shaft to a relatively small twist angle determined by the clearance between the flat sides of the control shaft and the flat edges 67A,67B. Relative rotation between the pawls 66A,66B and the control shaft through the twist angle occurs against a resilient restoring force attributable to torsional flexure and/or compression of the elastic bushing 64A.

A second pair of flat pawls 68A,68B are supported side-by-side on the control shaft 38 inside of the rectangular frame 56B by the elastic bushing 64B for rotation as a unit with the control shaft. Respective ones of a pair of flat edges of an aperture in each of pawls 68A,68B face the flat sides 44A,44B of the control shalt and cooperate therewith in limiting relative rotation between the pawls and the control shaft to a relatively small twist angle determined by the clearance between the flat sides of the control shaft and the flat edges of the apertures in the pawls. Relative rotation between the pawls 68A,68B and the control shaft through the twist angle occurs against a resilient restoring force attributable to torsional flexure and/or compression of the elastic bushing 64B.

Each of the pawls 66A,66B has a plurality of gear teeth 70 along an edge thereof defining respective ones of a pair of gear sectors 72A,72B on the pawls facing the rack gear 60 on the rectangular frame 56A. The edges of the pawls 66A,66B generally diametrically opposite the gear sectors 72A,72B define respective ones of a pair of lugs 74A,74B on the pawls facing, the plain edge 62 of the rectangular frame 56A. The pawls 68A,68B are identical to the pawls 66A,66B and include gear sectors and lugs facing respective ones of the rack gear 60 and the plain edge 62 on the rectangular frame 56B. The elastic bushing 64A cooperates with the apertures in each of the pawls 66A,66B in supporting the pawls on the control shaft 38 with the gear teeth 70 of the gear sector 72A angularly indexed or offset by one-half tooth pitch from the gear teeth 70 of the gear sector 72B, FIG. 4A. Likewise, the elastic bushing 64B cooperates with the apertures in each of the pawls 68A,68B in supporting the pawls on the control shaft with the gear teeth of their gear sectors angularly indexed or offset relative to each other by one-half tooth pitch.

When the control lever 52 is in its unlocked position, the screw threaded end 48 of the control shaft is unscrewed from the nut 46 enough to release the vertical sides 26A,32A and 26B,32B of the outer and the inner brackets for unobstructed relative linear translation concurrent with horizontal and vertical adjustment of the mast jacket 12. At the same time the pawls 66A,66B and 68A,68B are each oriented relative to the rectangular frames 56A,56B as illustrated in FIG. 4A such that the gear sectors on the pawls are remote from the rack gears so that the pawls do not interfere with vertical and horizontal adjustment of the mast jacket.

To capture concurrently the horizontal and vertical adjusted positions of the mast jacket 12, an operator manually pivots the control lever 52 from its unlocked position to its locked position. The boss 50 on the nut 46 cooperates with the vertical slot 34B in preventing rotation of the nut so that the control shaft becomes tensioned between the vertical sides of the outer bracket as the screw threaded end of the control shaft threads into the nut. In the locked position of the control shaft, the vertical sides 26A,32A and 26B,32B of the outer and the inner brackets are clamped together against the ends of the compression tube 40 to effect friction couples therebetween which capture by friction the adjusted position of the mast jacket.

As seen best in FIGS. 4A–4B, the pawls 66A,66B rotate counterclockwise with the control shaft 38 as the control lever pivots from its unlocked to its locked position. Because the gear sectors 72A,72B are angularly offset by one-half tooth pitch, FIG. 4A, the gear teeth 70 of the gear sector 72A engage the gear teeth 58 of the rack gear 60 first. If the gear teeth of the gear sector 72A and rack gear 60 engage flank-to-flank, they become fully meshed, FIG. 4B, as the control shaft nears its locked position. With gear sector 72A and the rack gear 60 fully meshed, the lug 74A on the pawl 66A bears against the plain edge 62 on the rectangular frame 56A. The locked position of the control shaft is calculated to occur after the gear sector 72A and the rack gear 60 are fully meshed in order to torsionally flex and/or compress the bushing 64A and resiliently bias the gear sector 72A and the rack gear 60 together. At the same time gear sector 72B on the pawl 66B may be partially or fully meshed with the rack gear 60 depending upon whether or not the gear teeth thereof are engaged peak-to-peak.

The lug 74A on the pawl 66A and the plain edge 62 on the rectangular frame 56A cooperate to positively prevent further counterclockwise rotation of the pawl 66A so that the rack gear 60 and the gear sector 72A define a meshed tooth couple between the inner and outer brackets 30,24 which reinforces the aforesaid friction couple therebetween against being overpowered by vertical vector components of the impact force on the steering hand wheel represented by the vector "F". The gear sectors on the pawls 68A,68B cooperate in identical fashion with the rack gear 60 and the plain edge 62 of the rectangular frame 56B when the control shaft 38 is in its locked position in defining a meshed tooth couple between the inner and outer brackets 30,24 which reinforces the aforesaid friction couple therebetween against being overpowered by horizontal vector components of the impact force on the steering hand wheel represented by the vector "F". Such horizontal and vertical reinforcement of the friction couple minimizes the likelihood of relative linear translation between the inner and the outer brackets during the aforesaid energy absorbing stroke of the outer bracket.

During rotation of the control shaft 38 toward its locked position, the gear teeth 70 on the pawl 66A may engage peak-to-peak on the rack gear teeth 58. In that circumstance, continued rotation of the control shaft to its locked position torsionally and/or compressively flexes the elastic bushing 64A between the pawl 66A and the control shaft to resiliently bias the gear sector 72A against the rack gear. At the same time, however, the gear teeth 70 of the gear sector 72B on the other pawl 66B cannot be aligned peak-to-peak with the rack gear teeth 58 because of the one-half tooth pitch offset between the gear sectors 72A,72B. Therefore, as the control shaft rotates to its locked position, the gear sector 72B on the pawl 66B is resiliently biased by torsional and/or compressive flexure of the elastic bushing 64A into full mesh with the rack gear teeth 58 with the lug 74B on the pawl 66B bearing against the plain edge 62 on the rectangular frame 56A.

The lug 74B on the pawl 66B and the plain edge 62 on the rectangular frame 56A cooperate to positively prevent further clockwise rotation of the pawl 66B so that the rack gear 60 and the gear sector 72B define a meshed tooth couple between the inner and outer brackets 30,24 which reinforces the aforesaid friction couple therebetween against being overpowered by vertical vector components of the impact force on the steering hand wheel represented by the vector "F". Tithe gear sectors on the pawls 68A,68B cooperate in identical fashion with the rack gear 60 and the plain edge 62 on the rectangular frame 56B to always achieve at least one meshed tooth couple when the control shaft 38 is in its locked position which reinforces the friction couple between the inner and the outer brackets against being overpowered by horizontal vector components of the impact force on the steering hand wheel represented by the vector "F".

What is claimed is:

1. A position control apparatus for a motor vehicle steering column having a mast jacket adjustable in a first direction comprising:

an outer bracket connected to a body of the motor vehicle having a stationary vertical side, an inner bracket rigidly attached to the mast jacket having a moveable vertical side juxtaposed the stationary vertical side, a slot in a first one of the stationary and the moveable vertical sides extending in the first direction, a control shaft supported on a second one of the stationary and the moveable vertical sides for rotation between a locked position and an unlocked position and extending through the slot in the first one of the stationary and the moveable vertical sides, a hollow rectangular frame means rigidly attached to the first one of the stationary and the moveable vertical sides around the control shaft having a rack gear parallel to the slot in the first one of the stationary and the moveable vertical sides and a plain edge parallel to the rack gear on the opposite side of the control shaft from the rack gear, a pair of pawls each having a sector gear thereon and a lug opposite the sector gear, a support means operative to support each of the pair of pawls side-by-side on the control shaft inside of the hollow rectangular frame for rotation as unit with the control shaft and for independent rotation relative to the control shaft through a twist angle against a resilient restoring force, the sector gears on the pair of pawls being angularly separated by one half tooth pitch so that at least one of the sector gears always meshes with the rack gear when the control shaft is rotated from the unlocked to the locked position thereof, and the lug on each of the pair of pawls bearing against the plain edge on the hollow rectangular frame means when the sector gear thereon is meshed with the rack gear and cooperating the plain edge in preventing rotation of the control shaft beyond the locked position thereof by preventing rotation of the pawl in the same direction of rotation.

2. The position control apparatus for a motor vehicle steering column recited in claim 1 wherein the support means comprises:

a flat side on the control shaft, an aperture in each of the pair of pawls around the control shaft having a flat edge facing the flat side of the control shaft and cooperating therewith in effecting a driving connection between control shaft and each of the pawls after relative rotation therebetween through the twist angle, and an elastic bushing between each of the pair of pawls and the control shaft resiliently flexed and exerting a restoring force on respective ones of the pawls during relative rotation between the control shaft and respective ones of the pawls through the twist angle.

3. The position control apparatus for a motor vehicle steering column recited in claim 1 further comprising:

a friction clamp means operative to clamp together the stationary and the moveable vertical sides of the inner and the outer brackets to effect a friction couple therebetween when the control shaft is rotated from the locked position to the unlocked position thereof.

4. A position control apparatus for a motor vehicle steering column having a mast jacket adjustable in a first direction and in a second direction comprising:

an outer bracket connected to a body of the motor vehicle including a stationary vertical side having a stationary slot therein extending in the first direction, an inner bracket rigidly attached to the mast jacket including a moveable vertical side juxtaposed the stationary vertical side having a moveable slot therein extending in the second direction and intersecting the stationary slot, a control shaft traversing the stationary and the moveable vertical slots and supported at the intersection therebetween for rotation between a locked position and an unlocked position, a stationary hollow rectangular frame means rigidly attached to the stationary vertical side around the control shaft having a rack gear parallel to the stationary slot and a plain edge parallel to the rack gear on the opposite side of the control shaft from the rack gear, a moveable hollow rectangular frame means rigidly attached to the moveable vertical side around the control shaft having a rack year parallel to the moveable slot and a plain edge parallel to the rack gear on the opposite side of the control shaft from the rack gear, a first pair of pawls each having a sector gear thereon and a lug opposite the sector gear, a first support means operative to support each of the first pair of pawls side-by-side on the control shaft inside of the stationary hollow rectangular frame for rotation as unit with the control shaft and for independent rotation relative to the control shaft through a twist angle against a resilient restoring force, the sector gears on the first pair of pawls being angularly separated by one half tooth pitch to assure that at least one of the sector gears always meshes with the rack gear when the control shaft is rotated from the unlocked to the locked position thereof, and the lug on each of the first pair of pawls bearing against the plain edge on the stationary hollow rectangular frame means when the sector gear thereon is meshed with the rack gear and cooperating the plain edge in preventing rotation of the control shaft beyond the locked position thereof by preventing rotation of the pawl in the same direction of rotation, a second pair of pawls each having a sector gear thereon and a lug opposite the sector gear, and a second support means operative to support each of the second pair of pawls side-by-side on the control shaft inside of the moveable hollow rectangular frame for rotation as unit with the control shaft and for independent rotation relative to the control shaft through the twist angle against a resilient restoring force, the sector gears on the second pair of pawls being angularly separated by one half tooth pitch to assure that at least one of the sector gears always meshes with the rack gear when the control shaft is rotated from the unlocked to the locked position thereof, and the lug on each of the second pair of pawls bearing against the plain edge on the moveable hollow rectangular frame means when the sector gear thereon is meshed with the rack gear and cooperating the plain edge in preventing rotation of the control shaft beyond the locked position thereof by preventing rotation of the pawl in the same direction of rotation.

5. The position control apparatus for a motor vehicle steering column recited in claim 4 wherein:

the first support means and the second support means comprises:

a flat side on the control shaft, an aperture in each of the first pair of pawls around the control shaft having a flat edge facing the flat side of the control shaft and cooperating therewith in effecting a driving connection between control shaft and each of the first pair of pawls after relative rotation therebetween through the twist angle, a first elastic bushing between each of the first pair of pawls and the control shaft resiliently flexed during relative rotation between the control shaft and each of the first pair of pawls through the twist angle, an aperture in each of the second pair of pawls around the control shaft having a flat edge facing the flat side of the control shaft and cooperating therewith in effecting a driving connection between control shaft and each of the second pair of pawls after relative rotation therebetween through the twist angle, and a second elastic bushing between each of the second pair of pawls and the control shaft resiliently flexed during relative rotation between the control shaft and each of the second pair of pawls through the twist angle.

6. The position control apparatus for a motor vehicle steering column recited in claim 5 further comprising:

a friction clamp means operative to clamp together the stationary and the moveable vertical sides of the inner and the outer brackets to effect a friction couple therebetween when the control shaft is rotated from the unlocked position to the locked position.

* * * * *